United States Patent
Chen et al.

(10) Patent No.: US 10,373,335 B1
(45) Date of Patent: Aug. 6, 2019

(54) SYSTEM AND METHOD FOR LOCATION RECOGNITION AND LEARNING UTILIZING CONVOLUTIONAL NEURAL NETWORKS FOR ROBOTIC EXPLORATION

(71) Applicant: HRL Laboratories, LLC, Malibu, CA (US)

(72) Inventors: Yang Chen, Westlake Village, CA (US); Jiejun Xu, Chino, CA (US); Deepak Khosla, Camarillo, CA (US)

(73) Assignee: HRL Laboratories, LLC, Malibu, CA (US)

( * ) Notice: Subject to any disclaimer, the term of this patent is extended or adjusted under 35 U.S.C. 154(b) by 269 days.

(21) Appl. No.: 15/399,429

(22) Filed: Jan. 5, 2017

Related U.S. Application Data

(63) Continuation-in-part of application No. 14/328,402, filed on Jul. 10, 2014, now abandoned.
(Continued)

(51) Int. Cl.
*G06K 9/00* (2006.01)
*G06T 7/73* (2017.01)
(Continued)

(52) U.S. Cl.
CPC .......... *G06T 7/75* (2017.01); *G06K 9/00664* (2013.01); *G06K 9/00791* (2013.01);
(Continued)

(58) Field of Classification Search
CPC ........... G06K 9/00624; G06K 9/0063; G06K 9/00664; G06K 9/00791; G06K 9/46; G06K 9/4671; G06K 9/4676; G06K 9/62; G06K 9/6201; G06K 9/6202; G06K 9/6267; G06K 9/6271; G06K 9/6272; G06K 9/6276; G06T 7/70; G06T 7/73; G06T 7/75; G06F 17/30244; G06F 17/30247; G06N 3/04; G06N 5/046; G06N 20/00
USPC ........ 382/100, 103, 104, 153, 155, 159, 181, 382/209, 217, 218, 224, 291, 305, 325; 348/113, 116–118; 701/1–3, 28, 400,
(Continued)

(56) References Cited

U.S. PATENT DOCUMENTS 7,650,013 B2   1/2010   Dietsch
7,831,094 B2 * 11/2010   Gupta ................ G06K 9/00201
                                                             382/103
(Continued)

OTHER PUBLICATIONS

Zetao Chen, Obadiah Lam, Adam Jacobson and Michael Milford, "Convolutional Neural Network-based Place Recognition", arXiv: 1411.1509, Dec. 2014, pp. 1-8 (Year: 2014).*
(Continued)

*Primary Examiner* — Eric Rush
(74) *Attorney, Agent, or Firm* — Tope-McKay & Associates

(57) ABSTRACT

Described is a system for location recognition for mobile platforms, such as autonomous robotic exploration. In operation, an image in front of the platform is converted into a high-dimensional feature vector. The image reflects a scene proximate the mobile platform. A candidate location identification of the scene is then determined. The candidate location identification is then stored in a history buffer. Upon receiving a cue, the system then determines if the candidate location identification is a known location or a new location.

15 Claims, 4 Drawing Sheets

Related U.S. Application Data

(60) Provisional application No. 62/274,875, filed on Jan. 5, 2016.

(51) Int. Cl.
*G06N 3/04* (2006.01)
*G06N 5/04* (2006.01)
*G06K 9/62* (2006.01)
*G06N 20/00* (2019.01)

(52) U.S. Cl.
CPC .............. *G06K 9/6276* (2013.01); *G06N 3/04* (2013.01); *G06N 5/046* (2013.01); *G06N 20/00* (2019.01)

(58) Field of Classification Search
USPC ....... 701/408, 409, 450, 461, 519, 521, 523, 701/524, 526
See application file for complete search history.

(56) References Cited

U.S. PATENT DOCUMENTS

| | | | | |
|---|---|---|---|---|
| 7,847,844 | B2* | 12/2010 | Takemoto | G06F 3/0325 382/154 |
| 8,180,146 | B2 | 5/2012 | Ngan | |
| 8,498,488 | B2* | 7/2013 | Yoon | G06K 9/00791 382/207 |
| 8,831,872 | B2* | 9/2014 | Hong | G05D 1/0253 382/153 |
| 9,346,167 | B2* | 5/2016 | O'Connor | G06N 3/008 |
| 2011/0150324 | A1* | 6/2011 | Ngan | G06K 9/4671 382/159 |
| 2011/0282897 | A1* | 11/2011 | Li | G06K 9/4671 707/769 |
| 2012/0121161 | A1* | 5/2012 | Eade | G06K 9/6201 382/153 |
| 2012/0306847 | A1* | 12/2012 | Lim | G06K 9/00744 345/418 |
| 2013/0060766 | A1* | 3/2013 | Lin | G06K 9/6212 707/723 |
| 2013/0288702 | A1 | 10/2013 | Abu-Alqumsan | |
| 2014/0010407 | A1 | 1/2014 | Sinha | |
| 2014/0222783 | A1* | 8/2014 | Chang | G06K 9/00671 707/722 |
| 2015/0281910 | A1* | 10/2015 | Choudhury | G01S 5/021 455/456.1 |
| 2015/0294193 | A1* | 10/2015 | Tate | G06K 9/6215 382/159 |

OTHER PUBLICATIONS

Junqiu Wang, Hongbin Zha and Roberto Cipolla, "Coarse-to-Fine Vision-Based Localization by Indexing Scale-Invariant Features", IEEE, Transactions on Systems, Man, and Cybernetics—Part B, vol. 36, No. 2, Apr. 2006, pp. 413-422 (Year: 2006).*

Murillo, A.C., et al., "Localization in Urban Environments Using a Panoramic Gist Descriptor," IEEE Transaction on Robotics, 2013, pp. 146-160.

Liu, Y., et al., "Visual Loop Closure Detection with a Compact Image Descriptor," IEEE International Conference on Intelligent Robots and Systems, 2012, pp. 1051-1056.

Cadena, C., et al., "Robust place recognition with stereo cameras," IEEE International Conference on Intelligent Robots and Systems, 2010, pp. 5182-5189.

Angeli, A., et al., "Fast and incremental method for loop-closure detection using bags of visual words," IEEE Transaction on Robotics, vol. 24, No. 5, 2008, pp. 1027-1037.

Rublee, E., et al., "ORB: An efficient alternative to SIFT or SURF," IEEE International Conference on Computer Vision, 2011, pp. 2564-2571.

Leutenegger, S., et al., "BRISK: Binary Robust Invaritn Scalable Keypoints," IEEE International Conference on Computer Vision, 2011, pp. 2548-2555.

Calonder, M., et al., "BRIEF: Binary Robust Independt Elementary Features," IEEE International Conference on Computer Vision, 2010, pp. 1-14.

Office Action 1 for U.S. Appl. No. 14/328,402, dated Oct. 4, 2016.

Galvez-Lopez, D., et al., "Real-Time Loop Detection with Bags of Binary Words," IEEE International Conference on Intelligent Robots and Systems, Sep. 2011, pp. 51-58.

Response to office Action 1 for U.S. Appl. No. 14/328,402, dated Jan. 4, 2017.

Office Action 2 for U.S. Appl. No. 14/328,402, dated May 4, 2017.

Michael Calonder, et al., "BRIEF: Computing a Local Binary Descriptor Very Fast," IEEE Transactions on Pattern Analysis and Machine Intelligence, vol. 34, No. 7, July 2012, pp. 1281-1298.

Junqiu Wang, et al., "Coarse-to-tine vision-based localization by indexing scale-invariant features," IEEE Transactions on Systems, Man, and Cybernetics, Part B Cybernetics, vol. 36, No. 2, Apr. 2006, pp. 413-422.

Junjun Wu, et al., "Visual loop closure detection by matching binary visual features using locality sensitive hashing," IEEE, Proceedings of the 11th World Congress on Intelligent Control and Automation, Jul. 4, 2014, pp. 940-945.

LeCun, Yann, Koray Kavukcuoglu, and Clément Farabet.(2010) "Convolutional networks and applications in vision." Circuits and Systems (ISCAS), Proceedings of 2010 IEEE International Symposium on. IEEE, 2010, pp. 253-256.

Y. LeCun, B. Boser, J. S. Denker, D. Henderson, R. E. Howard, W. Hubbard, and L. D. Jackel, (1989) "Backpropagation applied to handwritten zip code recognition," Neural Computation, 1989, pp. 541-551.

Chen, Zetao, et al. "Convolutional Neural Network-based Place Recognition." arXiv preprint arXiv:1411.1509 (2014). ACRA, Melbourne, Australia, Dec. 2014, pp. 1-8.

Response to Office Action 2 for U.S. Appl. No. 14/328,402, dated Sep. 11, 2017.

Office Action 3 for U.S. Appl. No. 14/328,402, dated Oct. 3, 2017.

Benjamin Kuipers and Yung-Tai Byun, "A robot exploration and mapping strategy based on a semantic hierarchy of spatial representations", Elsevier, Robotics and Autonomous Systems 8, 1981, pp. 47-63.

Tom Duckett, Stephen Marsland, and Jonathan Shapiro, "Fast, On-Line Learning of Globally Consistent Maps", Autonomous Robots 12, 2002, pp. 287-300.

* cited by examiner

SYSTEM AND METHOD FOR LOCATION RECOGNITION AND LEARNING UTILIZING CONVOLUTIONAL NEURAL NETWORKS FOR ROBOTIC EXPLORATION

CROSS-REFERENCE TO RELATED APPLICATIONS

This is a Continuation-in-Part application of U.S. patent application Ser. No. 14/328,402, filed Jul. 10, 2014, the entirety of which is hereby incorporated by reference.

This is ALSO a non-provisional patent application of U.S. Provisional Application No. 62/274,875, filed on Jan. 5, 2016, the entirety of which is hereby incorporated by reference.

STATEMENT REGARDING FEDERALLY SPONSORED RESEARCH OR DEVELOPMENT

This invention was made with Government support under Contract Number Synapse HR0011-09-C-0001 awarded by DARPA. The Government has certain rights in the invention.

BACKGROUND OF INVENTION

(1) Field of Invention

The present invention relates to a system and method for robotic location recognition and, more specifically, to one that makes use of convolutional neural networks.

(2) Description of Related Art

Autonomous robotic exploration typically requires some form of navigational system. In robotic navigation applications, it is desirable to have the robot remember places it has visited to avoid repeat visits or confirm robot location for path planning purposes. Traditionally this problem is solved in computer vision by extracting local image features of a new location and matching them to a set of stored image features. Therefore, the design of image features is critical for robust performance of location recognition, but such features often carry a heavy computational load. Approaches of the prior art typically require a powerful computer to implement, limiting their application to bigger robotic platforms with more powerful computing resources.

Thus, a continuing need exists for a system that provides for computationally efficient location recognition and learning for robotic exploration.

SUMMARY OF INVENTION

Described is a system for location recognition. In various embodiments, the system includes one or more processors and a memory. The memory includes executable instructions encoded thereon, such that upon execution of the instructions, the one or more processors perform several operations, such as converting an image into a high-dimensional feature vector, the image reflecting a scene proximate a mobile platform; identifying a candidate location identification of the scene; storing the candidate location identification in a history buffer; and upon receiving a cue, determining if the candidate location identification is a known location or a new location.

In another aspect, in converting the image into the high-dimensional feature vector, a convolutional neural network (CNN) feature extractor generates one feature vector for each input image.

In yet another aspect, in identifying a candidate location identification of the mobile platform, a k Nearest Neighbor and majority voting process identifies a maximum consistent location ID from the feature database.

Further, determining if the candidate location identification is a known location or a new location further comprises operations of:

upon receiving the cue, processing images to generate feature vectors;

filling the history buffer with new location identifications, such that after $L_{buf}$ image frames has passed, the history buffer is filled with all new location identifications;

determining a most frequent location identification, $id_{max}$, exclusive of "−1", in the history buffer and comparing its frequency with a threshold, $T_{min}$, such that if the frequency is equal to or greater than $T_{min}$, then designating the candidate location as $id_{max}$ as a known location and ending, otherwise continuing;

generating a new unique location identification, $id_{new}$ for the candidate location;

replacing the location identification of each feature vector in the history buffer with $id_{new}$;

adding all the feature vectors in the history buffer into the feature database and designating the candidate location as a new location.

In yet another aspect, the system is mounted on a mobile platform and further includes a forward-looking video camera mounted on the mobile platform, the forward-looking video camera capturing the image of the scene proximate the mobile platform.

In another aspect, the system performs an operation of causing the mobile platform to move to a secondary location, the secondary location being a known location a new location. For example, a command is executed to cause the mobile platform to move to a randomly selected secondary location or any new point, such as a predetermined distance (e.g., 100 meters, etc.), and then designate the new point as a secondary location. At that point, the system then proceeds to determine if the new point or secondary location is a new location or a known location using the process as described herein.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
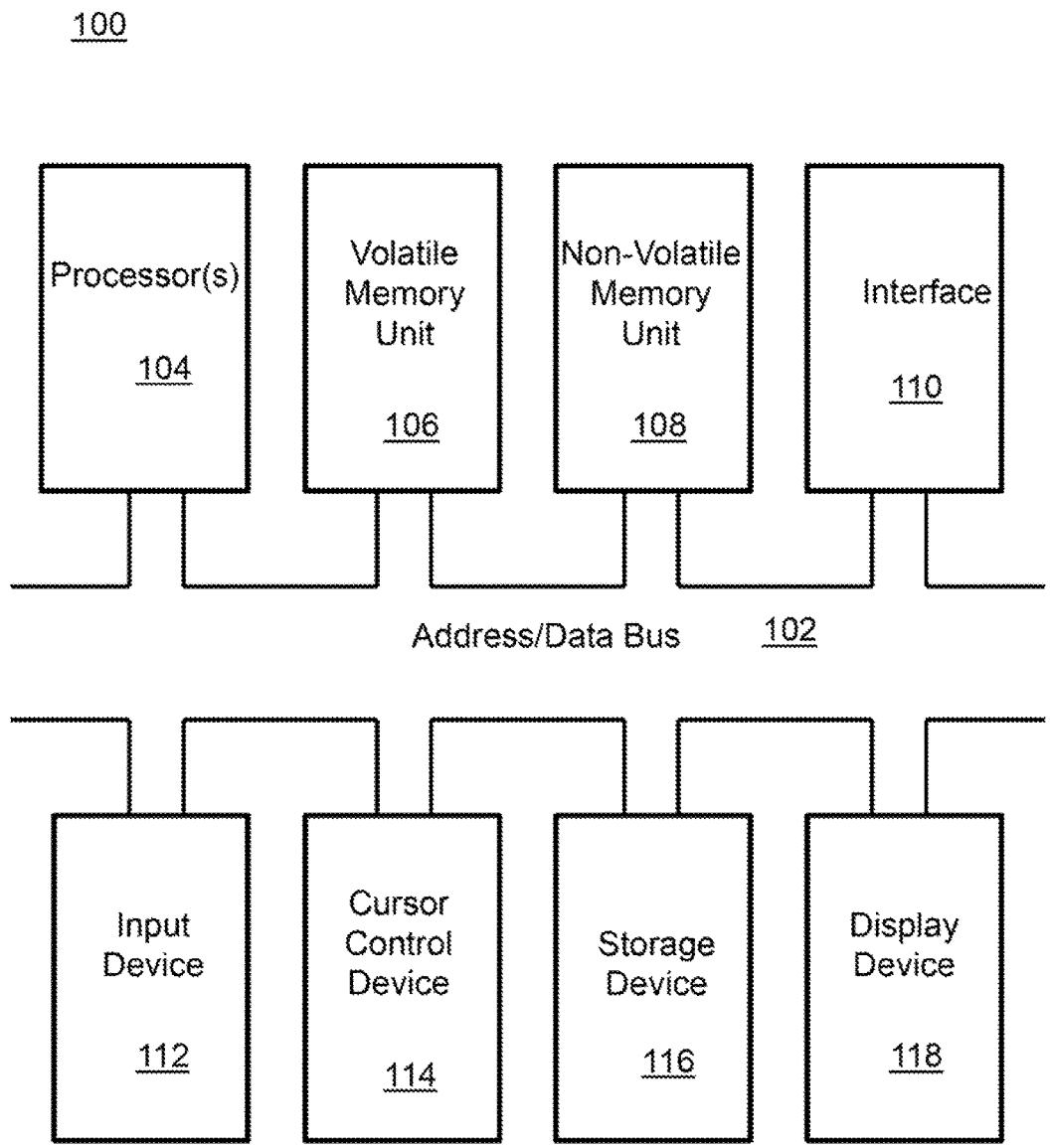
FIG. 1 is a block diagram depicting the components of a system according to various embodiments of the present invention.

The present invention relates to a system and method for robotic location recognition and, more specifically, to one that makes use of convolutional neural networks. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of incorporated literature references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. LeCun, Yann, Koray Kavukcuoglu, and Clément Farabet. (2010) "Convolutional networks and applications in vision." Circuits and Systems (ISCAS), Proceedings of 2010 IEEE International Symposium on. IEEE, 2010.
2. Y. LeCun, B. Boser, J. S. Denker, D. Henderson, R. E. Howard, W. Hubbard, and L. D. Jackel, (1989) "Backpropagation applied to handwritten zip code recognition," Neural Computation, 1989.
3. Chen, Zetao, et al. "Convolutional Neural Network-based Place Recognition." arXiv preprint arXiv:1411.1509 (2014). ACRA, Melbourne, Australia, December 2014.

(2) Principal Aspects

Various embodiments of the invention include three "principal" aspects. The first is a system and method for robotic location recognition and, more specifically, to one that makes use of convolutional neural networks and majority voting of recognized locations. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
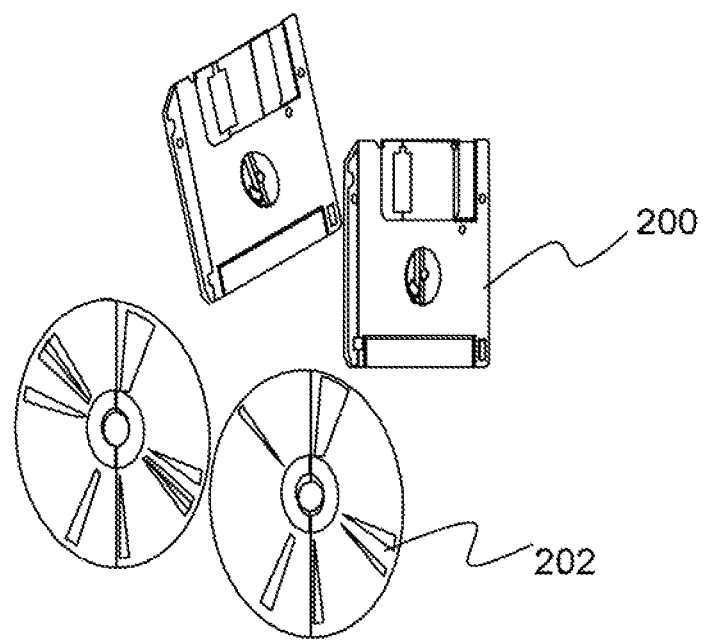
FIG. 2 is an illustration of a computer program product embodying an aspect of the present invention.

An illustrative diagram of a computer program product (i.e., storage device) embodying an aspect of the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

In robotic navigation applications, it is often necessary to have the robot remember places it has visited so as to avoid repeat visits or confirm robot location for path planning purposes. The system of the present disclosure represents an efficient method that allows a robot to recognize locations (such as rooms) it has previously visited from a video input. The system described herein improvise upon the prior art by employing a trained convolutional neural network as the front-end feature processor, and using a k-nearest neighbor (k-NN) approach to do robust recognition.

With the approach described in this disclosure, there is no requirement to develop sophisticated image features in order to empower a robot with the location recognition capability as most computer vision algorithms require. The input image from the videos on the robot are converted to high-dimensional feature vectors based on a pre-trained Convolutional Neural Network (CNN) pipeline. These features have been proven to be capable of distinguishing/discriminating a variety of vision problems that the CNN wasn't even originally trained for. In addition, such a CNN pipeline can be computed more efficiently and in spiking neuromorphic hardware in the near future, enabling low SWaP implementation on mobile platforms, such as small robots (e.g., microUAVs). Potential applications for the present invention include autonomous navigation for any mobile platform, including unmanned aerial and ground vehicles (UAVs and UGVs), and autonomous navigation in self-driving vehicles.

(4) Specific Details of Various Embodiments

As noted above, this disclosure provides a system for location recognition using a trained convolutional neural network (CNN) as the front-end feature processor, and using a k-nearest neighbor (k-NN) approach to do robust recognition. For further understanding, provided below is description of a CNN feature extractor, followed by a description of the flow diagram describing its implementation in the system of the present invention.

(4.1) CNN Feature Extractor

The system of this disclosure makes use of a type of neural network called a "convolutional neural network" (CNN). A CNN (see the List of Incorporated Literature References, Reference No. 1) is a supervised deep-learning neural network with multiple layers of similarly structured convolutional feature extraction operations followed by a linear neural network (NN) classifier. CNNs are an excellent model for image recognition because the structure allows automatic learning of image features. CNNs typically consist of alternating layers of simple and complex cells mimicking those found in mammalian visual cortex. Simple cells perform template matching and complex cells pool these results to achieve invariance. Typical CNNs have several of 3-layer convolution stages followed by a classifier stage which is a linear NN with one or more hidden layers. Each convolution stage has three layers: 1) a filter bank layer (convolutions) to simulate simple cells, 2) a non-linearity activation layer, and 3) a feature pooling layer to simulate complex cells. The entire network can be trained using backpropagation with stochastic gradient descent (see Literature Reference No. 2).

Figure 3:
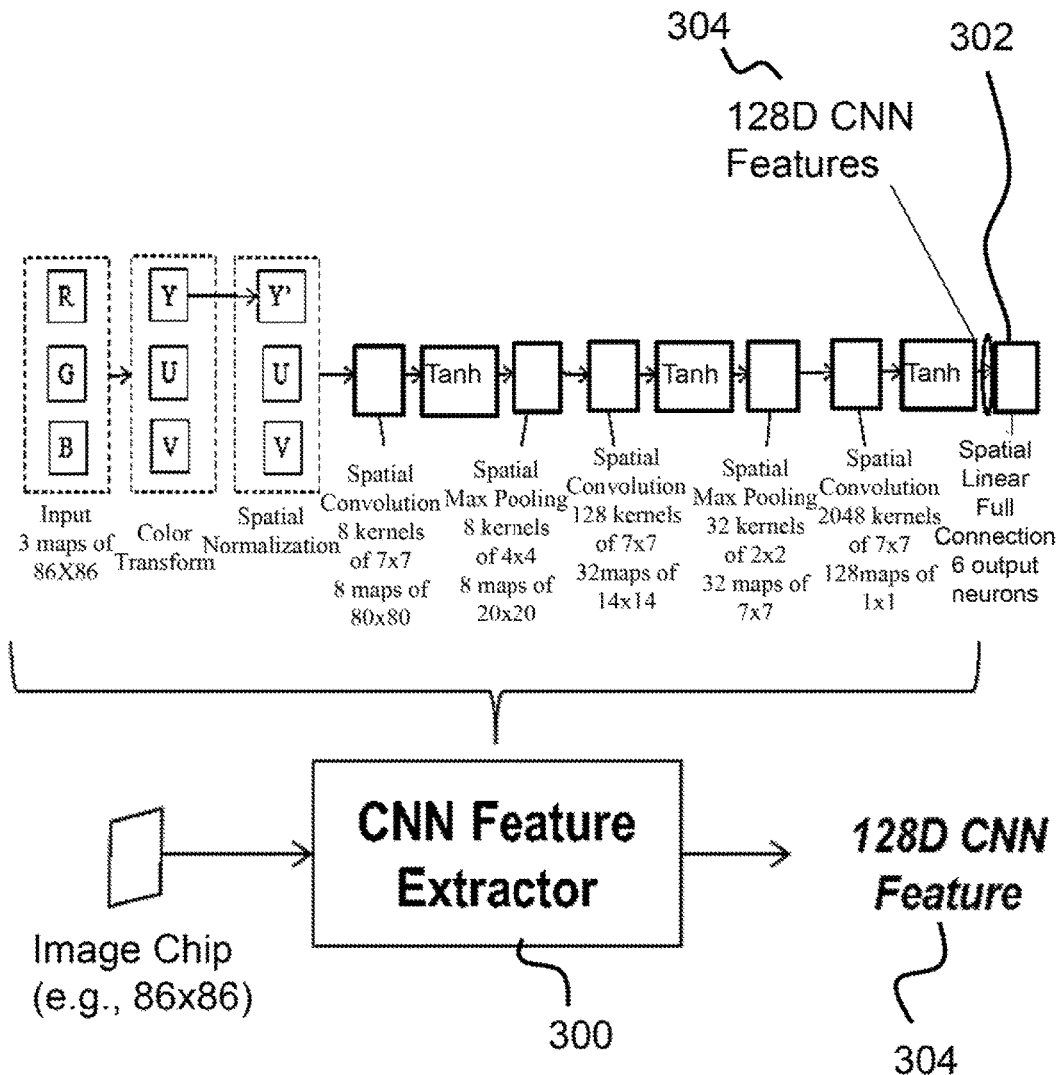
FIG. 3 is an illustration of a convolutional neural network (CNN) Feature Extractor according to an embodiment of the present invention.

With respect to the present invention, CNNs are only used to extract high-dimensional features, as illustrated in FIG. 3. FIG. 3 shows a typical CNN 300 with several layers of convolution (as described above) followed by a linear NN classifier 302. The CNN features 304 in question are the ones feeding the NN classifier 302 as shown in FIG. 3. In this example, the dimension of the features is 128; however, in general it can be higher or lower depending on the application. The CNN 300 used as a feature extractor must be trained before use with the NN classifier 302 as the final stage. Desirably, the training is done using images similar to or related to the location recognition application. For example, if the location recognition is for office scenes, then one can train the CNN 300 with office scenes, but not necessarily the same ones in the final location recognition task. For example, training can be done with the well-known error back-propagation algorithm (See Literature Reference No. 2).

(4.2) Location Recognition and Learning Method

Figure 4:
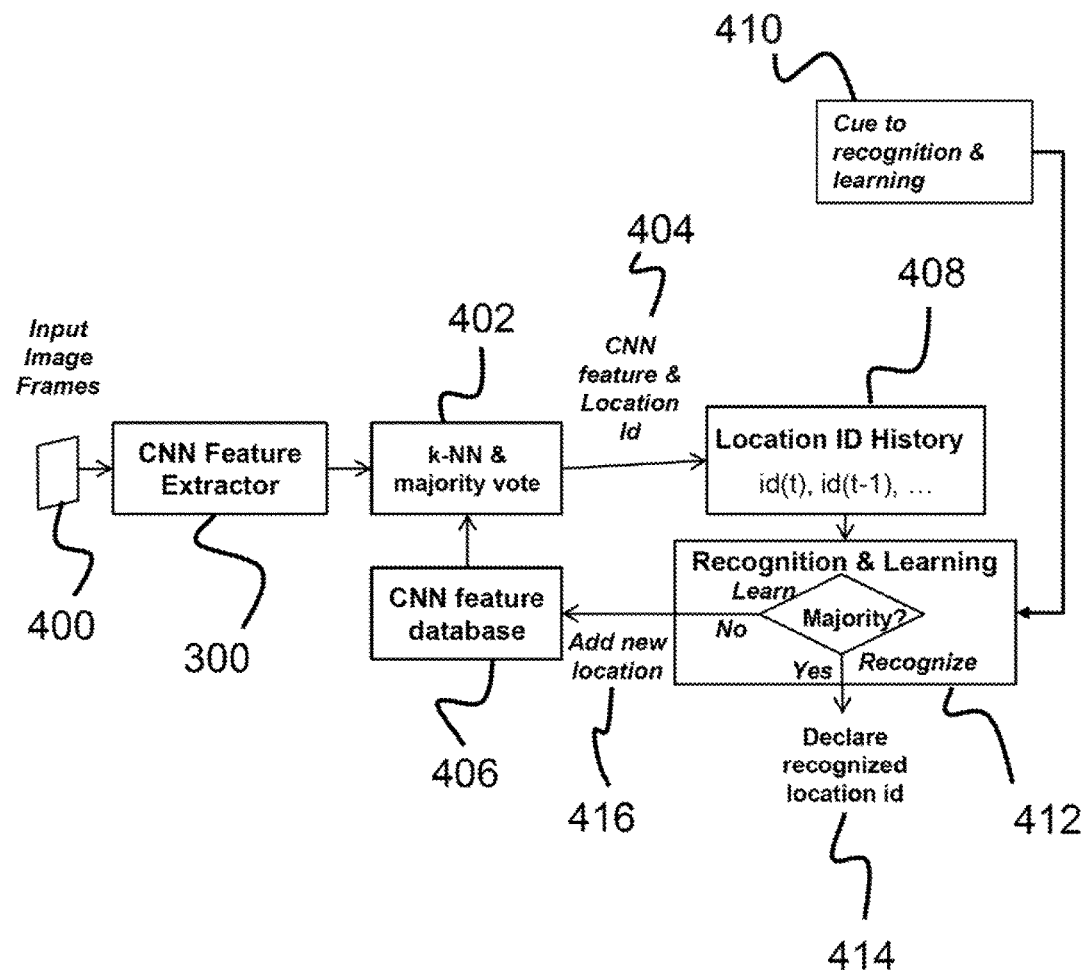
FIG. 4 is an illustration of a location recognition flow diagram according to an embodiment of the present invention.

The location recognition and learning process according to this disclosure is illustrated in FIG. 4. Here it is assumed that the host mobile platform (e.g., an unmanned robotic vehicle operated in the air, on the ground or in the water, etc.) has a forward-looking video camera, and the camera captures the video images as the platform moves from location to location. The video images are used as input to the system, and the processing outlined in FIG. 4 is carried out as described below. The video images or input image reflect, for example, scenes proximate a mobile platform. The first step is the CNN Feature Extractor 300, which converts the input image 400 into a high-dimensional feature vector. The next block is "k-NN and majority vote" 402 which uses k-NN (k Nearest Neighbor) approach to find candidate location ID's 404 from a CNN feature database 406. The candidate location ID's are stored in a limited length "history buffer" 408. The rest of the flow requires an external supervision signal (the "cue") 410 which tells the system to trigger the recognition logic (in the decision logic unit 412) that follows. This recognition logic will allow the system to recognize 414 that the platform has reached a known location, or otherwise learn a new location 416. The details of the system operation are described below.

(4.3) CNN Feature Extractor

As video images 300 stream into the system, the entire image is first rescaled into the canonical input image size of the CNN Feature Extractor 300. The canonical input image size is the same as the canonical input image size of the corresponding CNN, which is defined as the minimal image size that allows the CNN to produce one high-dimensional feature vector. In the non-limiting example shown in FIG. 3, this size is 86 pixels×86 pixels. Therefore, in this example, all input images are resized to 86×86 regardless of the aspect ratio of the original images. Furthermore, the CNN Feature Extractor 300 produces one feature vector (in the example shown in FIG. 3, it is a 128-D vector) for each input image 400. This feature vector is the input to the next block.

(4.4) k-NN and Majority Vote

For the "k-NN and majority vote" 402 processing block to work, a non-empty "CNN feature database" 406 is needed, which stores a set of learned CNN features along with the location ID's the features belong to. Initially the database 406 is empty, therefore the CNN features from the "CNN Feature Extractor" 300 go straight to the ID history buffer 408, with a location ID of "−1". Otherwise, provided below are the steps the system normally goes through when the database 406 is not empty:

1. For each CNN feature vector, f(t), (the t here refers to the time or video image frame index) received at this block 402, find the k nearest neighbors (i.e., k-NN, with k typically a small integer such as 5 or 7) within the CNN feature database 406 to the CNN feature f(t). The k-NN distance metric is a squared Euclidean distance. Each of these nearest neighbors is another feature vector with a location ID attached from previous learning events (described below). This set of nearest neighbors is called $S_k$;
2. Apply a threshold $T_d$ to the squared distances of the CNN feature vector f(t) to the feature vectors in $S_k$, and discard any feature vectors whose squared distance to f(t) exceeds $T_d$; the set $\underline{S}_k$ now becomes $S_{k,T} \subseteq S_k$.
3. Find the maximum consistent location ID, id(t), for feature vectors in $S_{k,T}$. The maximum consistent location ID is the location ID attached to the feature vector in $S_{k,T}$ which has the most occurrence (majority voting), and number of occurrence is equal to or exceeds a threshold $T_{ID}$. If the number of occurrence of the most frequent location ID does not reach $T_{ID}$, then the maximum consistent location ID is set to −1.

The output from this block 402 is the CNN feature vector f(t), and the maximum consistent location ID, id(t) (collectively labelled as element 404 in FIG. 4).

(4.5) Location ID History

The location ID history 408 is a FIFO (first-in, first-out) buffer of length $L_{buf}$ with each unit of the buffer storing a pair of CNN feature f and the associated location ID, id. This limited length location ID history is used for making decisions for location recognition and learning.

(4.6) Recognition and Learning

Location recognition and learning in the present invention happens in the same decision logic unit 412. The decision logic unit 412 also operates on cue 410; that is when a signal from the system controller (e.g. on board of the robotic platform) is received. This cue 410 signal tells the location recognition and learning (i.e., decision logic unit 412) to either recognize 414 the present location of the robotic platform, or learn to remember it (as a new location 416) so it can recognize the location later when the robot visits this same location again. This signal can come from some other sensor modules onboard the platform. For example, the system controller can send such a cue signal when the platform enters a room, or reaches a hallway junction or a gate. The decision logic unit 412 operates as follows:

1. Once a cue 410 is received, the system starts to process input images 400, produce CNN feature vectors, and fill the location ID history buffer 408. After $L_{buf}$ image frames has passed, the location ID history buffer 408 is filled with all new location IDs;
2. Compute the most frequent location ID, $id_{max}$, exclusive of "−1", in the location ID history buffer 408, and compare its frequency with a threshold, $T_{min}$. If the frequency is equal to or greater than $T_{min}$, then output the location as $id_{max}$, and end the decision logic; otherwise continue to the next step;
3. This is a new location and must be learned by remembering all the CNN feature vectors in the location ID history buffer 408, by performing the following steps:
    a. First create a new unique location ID, $id_{new}$;
    b. Replace the location ID of every feature vector in location ID history buffer 408 with $id_{new}$;
    c. Add all the feature vectors in the location ID history buffer 408 into the CNN feature database 406, keeping the newly assigned location ID.

When the recognition and learning decision process is complete, the system goes back to idle, waiting for new system cues, and the process repeats. Therefore, when the system starts with an empty CNN feature database 406, the first system cue will trigger the learning of the first new location. Subsequent cues will trigger the system to compare the CNN features of the new location with those stored in database 406 through k-NN search, thresholding and voting. Notably, the learning can be done offline or, desirably, online such that the system learns while in the operation of recognition.

(4.7) CNN Feature Database

The function of CNN feature database 406 is to store the CNN features during learning, and support k-NN search. There are many ways to support this function, and one example implementation will be described below.

(4.8) Example Reduction to Practice

The system for location recognition and learning as described above has been implemented on a computer and can be executed in real-time. A few practical considerations in the reduction to practice are described below, which are only examples of desired implementations, and by no means limit alternative implementations as long as they are consistent with the principles described herein.

(4.8.1) Training of CNN Feature Extractor

As described previously, the CNN feature extractor 300 comes from a fully trained CNN with the last layer of classifier removed. To train the original CNN, training videos were taken in the hallways and offices of a laboratory. The images from the videos were used to train a CNN using error back-propagation. Once the training was complete, the last layer of the CNN was removed, and the remaining layers were used as the CNN feature extractor 300. For testing location recognition and learning, videos acquired from a different video camera (in the same general area where the training videos were taken) were used. The CNN used in experiments utilizing the present invention produced 128-dimensional (128-D) features with components having values ranging approximately between −10.0 to 10.0.

(4.8.2) CNN Feature Database and k-NN Search

The CNN feature database 406 was implemented using the k-D tree in the FLANN (Fast Library for Approximate Nearest Neighbors) package in OpenCV version 2.3.1. The k-D tree was initialized to have two parallel trees for speed. The k-NN search was carried out by the knnSearch( ) function with search parameter set to 64. Other pertinent parameters related to k-NN and voting were:

k=8 (for k-NN)

$T_d$=2 (for k-NN distance threshold)

$T_{min}$=5 (location ID frequency threshold in location ID history buffer)

$L_{buf}$=20 (location ID history buffer length)

(4.8.3) Recognition and Learning

With respect to the recognition and learning aspect of the present invention, after the system gets the cue, incoming images are processed frame by frame. In practice, it has been found that sometimes it is better to skip frames for speed and computational efficiency. With respect to the experiments related to the present invention, only every other frame was processed. Accordingly, for location ID history buffer length $L_{buf}$=20, it takes 40 image frames to pass before the buffer is filled. This time span can be adjusted by both the buffer length $L_{buf}$ and the skip factor, so a relatively good coverage of the scene at the location the system needs to learn and recognize is achieved.

An experimental software was created based on the above descriptions and parameters. In a test video in which a camera was carried by a person to simulate a robotic platform, the person visited two offices and two laboratories. Thereafter, one office and one laboratory were revisited. Each time the person entered room or lab, the system was given a cue to carry out learning and recognition as outlined above. Experimentally, all three locations (two offices and two laboratories) were correctly learned on the first visit, and all three locations were recognized on revisit. Thus, the experimental tests verified the operational accuracy of the system described herein.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for location recognition of a mobile platform, comprising:
    a forward-looking video camera mounted on the mobile platform, the forward-looking video camera operable for capturing images of a scene proximate the mobile platform;
    one or more processors and a memory, the memory having executable instructions encoded thereon, such that upon execution of the instructions, the one or more processors perform operations of:
        converting images captured by the camera into a high-dimensional feature vector identifying a candidate location identification of the scene;

storing the candidate location identification in a history buffer; and upon receiving a cue, determining if a location of the scene is a known location or a new location by performing operations of:

upon receiving the cue, processing images to generate feature vectors;

filling the history buffer with new location identifications, such that after $L_{buf}$ image frames has passed, the history buffer is filled with all new location identifications;

determining a most frequent location identification, $id_{max}$, exclusive of "−1", in the history buffer and comparing its frequency with a threshold, $T_{min}$, such that if the frequency is equal to or greater than $T_{min}$, then designating the location of the scene as $id_{max}$ as a known location and ending, otherwise continuing;

generating a new unique location identification, $id_{new}$ for the location of the scene;

replacing the location identification of each feature vector in the history buffer with $id_{new}$; and adding all the feature vectors in the history buffer into a feature database and designating the location of the scene as a new location.

2. The system as set forth in claim 1, wherein in converting the images into the high-dimensional feature vector, a convolutional neural network (CNN) feature extractor generates one feature vector for each input image.

3. The system as set forth in claim 2, wherein in identifying a candidate location identification of the scene, a k Nearest Neighbor and majority voting process identifies a maximum consistent location ID from the feature database.

4. The system as set forth in claim 3, further comprising an operation of causing the mobile platform to move to a secondary location, the secondary location being a known location or a new location.

5. The system as set forth in claim 1, wherein in identifying a candidate location identification of the scene, a k Nearest Neighbor and majority voting process identifies a maximum consistent location ID from the feature database.

6. A computer program product for location recognition of a mobile platform, the computer program product comprising:

a non-transitory computer-readable medium having executable instructions encoded thereon, such that upon execution of the instructions by one or more processors, the one or more processors perform operations of:

causing a forward-looking video camera mounted on the mobile platform to capture images of a scene proximate the mobile platform;

converting images captured by the camera into a high-dimensional feature vector identifying a candidate location identification of the scene;

storing the candidate location identification in a history buffer; and upon receiving a cue, determining if a location of the scene is a known location or a new location by performing operations of:

upon receiving the cue, processing images to generate feature vectors;

filling the history buffer with new location identifications, such that after $L_{buf}$ image frames has passed, the history buffer is filled with all new location identifications;

determining a most frequent location identification, $id_{max}$, exclusive of "−1", in the history buffer and comparing its frequency with a threshold, $T_{min}$, such that if the frequency is equal to or greater than $T_{min}$, then designating the location of the scene as $id_{max}$ as a known location and ending, otherwise continuing;

generating a new unique location identification, $id_{new}$ for the location of the scene;

replacing the location identification of each feature vector in the history buffer with $id_{new}$; and adding all the feature vectors in the history buffer into a feature database and designating the location of the scene as a new location.

7. The computer program product as set forth in claim 6, wherein in converting the images into the high-dimensional feature vector, a convolutional neural network (CNN) feature extractor generates one feature vector for each input image.

8. The computer program product as set forth in claim 7, wherein in identifying a candidate location identification of the scene, a k Nearest Neighbor and majority voting process identifies a maximum consistent location ID from the features database.

9. The computer program product as set forth in claim 8, further comprising an operation of causing the mobile platform to move to a secondary location, the secondary location being a known location or a new location.

10. The computer program product as set forth in claim 6, wherein in identifying a candidate location identification of the scene, a k Nearest Neighbor and majority voting process identifies a maximum consistent location ID from the feature database.

11. A computer implemented method for location recognition of a mobile platform, the method comprising an act of:

causing one or more processors to execute instructions encoded on a non-transitory computer-readable medium, such that upon execution, the one or more processors perform operations of:

causing a forward-looking video camera mounted on the mobile platform to capture images of the scene proximate the mobile platform;

converting images captured by the camera into a high-dimensional feature vector identifying a candidate location identification of the scene;

storing the candidate location identification in a history buffer; and upon receiving a cue, determining if a location of the scene is a known location or a new location by performing operations of:

upon receiving the cue, processing images to generate feature vectors;

filling the history buffer with new location identifications, such that after $L_{buf}$ image frames has passed, the history buffer is filled with all new location identifications;

determining a most frequent location identification, $id_{max}$, exclusive of "−1", in the history buffer and comparing its frequency with a threshold, $T_{min}$, such that if the frequency is equal to or greater than $T_{min}$, then designating the location of the scene as $id_{max}$ as a known location and ending, otherwise continuing;

generating a new unique location identification, $id_{new}$ for the location of the scene;

replacing the location identification of each feature vector in the history buffer with $id_{new}$; and adding all the feature vectors in the history buffer into a feature database and designating the location of the scene as a new location.

12. The computer implemented method as set claim 11, wherein in converting the images into the high-dimensional feature vector, a convolutional neural network (CNN) feature extractor generates one feature vector for each input image.

13. The computer implemented method as set claim 12, wherein in identifying a candidate location identification of the scene, a k Nearest Neighbor and majority voting process identifies a maximum consistent location ID from the feature database.

14. The computer implemented method as set claim 13, further comprising an operation of causing the mobile platform to move to a secondary location, the secondary location being a known location or a new location.

15. The computer implemented method as set forth in claim 11, wherein in identifying a candidate location identification of the scene, a k Nearest Neighbor and majority voting process identifies a maximum consistent location ID from the feature database.

* * * * *